United States Patent [19]

Pelofsky

[11] 3,725,314
[45] Apr. 3, 1973

[54] RUBBER RECLAMATION USING ULTRASONIC ENERGY

[75] Inventor: Arnold H. Pelofsky, East Brunswick, N.J.

[73] Assignee: Cities Service Oil Company, Tulsa, Okla.

[22] Filed: June 25, 1971

[21] Appl. No.: 156,748

[52] U.S. Cl. ............... 260/2.3, 23/267 C, 23/312 A, 260/34.2, 260/719, 260/759, 260/767, 264/23
[51] Int. Cl. ............................................. C08f 47/24
[58] Field of Search......260/2.3, 34.2, 719, 759, 767; 23/267 C, 312 A; 264/23

[56] References Cited

UNITED STATES PATENTS

| | | | |
|---|---|---|---|
| 3,301,810 | 1/1967 | Hunter et al. | 260/34.2 |
| 3,084,020 | 4/1963 | Loosli | 264/23 |

Primary Examiner—Samuel H. Blech
Attorney—J. Richard Geaman

[57] ABSTRACT

A process for dissolving solid rubber articles such as tires into a liquid vehicle which comprises contacting the rubber while immersed in the liquid with a source of ultrasonic energy whereby the bulk rubber effectively disintegrates upon contact and dissolves into the liquid.

6 Claims, 2 Drawing Figures

PATENTED APR 3 1973                                3,725,314

INVENTOR.
ARNOLD H. PELOFSKY
BY J. Richard Geaman

ATTORNEY

RUBBER RECLAMATION USING ULTRASONIC ENERGY

BACKGROUND OF THE INVENTION

This invention is directed to a method of treating solid waste hydrocarbon materials by dissolving or suspending these materials in a suitable solvent for further treatment. More particularly this invention pertains to a method for effectively disintegrating rubber articles such as tires in a solvent as a method of reclaiming the hydrocarbon values present in the rubber and otherwise presenting disposal problems. Worn tires and other polymeric or plastic material represent a significant waste disposal problem in the developed nations. In the U.S. alone, something like 250 million worn out tires are discarded each year and must be disposed of. Burning them represents a decidedly undesirable approach in the present commercial content. As discarded garbage they represent a significant cost to those charged with disposing of them. It most assuredly would be preferable to attempt to reclaim the material in a most economical manner rather than adding it to the junk heap, garbage scow, sanitary fill or furnace. Thus any process that provides for the disposal of worn tires or plastic material while at the same time recycling the material into commercially viable channels is desirable, provided it is environmentally acceptable.

SUMMARY OF THE INVENTION

I have invented a process for reclaiming hydrocarbon values from solid hydrocarbon materials. The process comprises contacting the material with a source of ultrasonic radiation at a frequency of more than 10 kilohertz and a power intensity of approximately 100 watts per square centimeter of the material's surface area while the material is immersed in a suitable solvent. The solid material may be passed with the solvent between oppositely mounted ultrasonic transducers which reciprocatingly move towards and away from each other as the solid material and solvent feed pass between them.

It is therefore an object of the present invention to provide a process for the dissolution or suspension of hydrocarbon solid materials such as tires and plastics.

Another object of the present invention is to provide a process for dissolving solid tires in an aromatic solvent.

Still another object is to provide a process which acts to separate the insoluble constituents of a rubber tire from those that are dissolvable in an aromatic solvent.

Yet another object of the present invention is to provide apparatus for the dissolution of rubber in a solvent.

Other objects and advantages of the process and apparatus of the present invention will be apparent from the drawings and description of the preferred embodiments which follow.

DESCRIPTION OF THE PREFERRED EMBODIMENT

Ultrasonic energy when properly applied acts to mechanically agitate the various hydrocarbons components of rubber into a form which is dissolvable in an aromatic solvent. It appears that tire or other material upon being contacted with a probe radiating energy in the ultrasonic range and at a power intensity of from 25 to 400 W/cm² of solid material surface area will dissolve in an aromatic solvent. A worn "rayon" tire requires 100 W/cm² whereas certain plastics require 25 W/cm². According to the method of my invention, a rubber article when immersed in liquid hydrocarbon solvent is then directly contacted with a probe emanating ultrasonic energy and thereby caused to disintegrate and dissolve in the hydrocarbon liquid. More particularly the rubber article is immersed in an aromatic carbon black feedstock and contacted with an ultrasonic transducer emanating energy within the range of from about 10 kilohertz (kHz) to 40 kHz and at a power intensity of from about 50 watts per square centimeter (W/cm²) to about 400 W/cm² of material surface area depending on the material to be dissolved.

Figure 1:
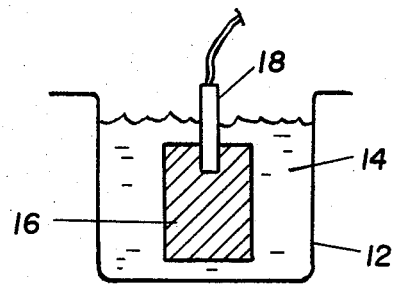
FIG. 1 is an illustration of the process wherein an ultrasonic probe contacts rubber immersed in a solvent.

With reference to the process of this invention, consider FIG. 1 of the drawing which shows a container 12 filled with a hydrocarbon solvent 14 in which a piece of scrap rubber 16 is immersed. The rubber 16 is contacted with an ultrasonic probe 18 emitting ultrasonic energy and powered via lines from a conventional source not shown. Suitable hydrocarbon solvents which may be employed are various simple aromatic hydrocarbons, such as benzene, toluene, xylene, etc., including various petroleum fractions containing at least 10 to 20 percent aromatic constituents such as a carbon black feedstock, etc. While such aromatic hydrocarbon type solvents are preferred because of the fact that such solvents are suitable feedstocks of preparing carbon blacks, other hydrocarbon liquids may be used as immersing liquids such as naphthenes, naphthas, light gas oils, and other hydrocarbon oils boiling in the range of from 300°F to about 750°F.

To further illustrate the process described above, a portion of an old tire weighing 33 grams was immersed in 56 grams of aromatic carbon black feedstock and contacted with an ultrasonic probe emitting ultrasonic irradiation at a level of about 20 kHz and at a power intensity of 100 W/cm². The probe was continually pressed into portions of the rubber for short periods of time and the application was continued for a period of about 5 minutes. At the end of the 5 minutes, the slice of rubber was removed from the container and washed with acetone, dried and weighed. Weight loss was found to be about 15 percent wt. of the original tire material, indicating that about 15 percent of the tire material was dissolved into the carbon black feedstock solvent. During the course of contacting the immersed tire slice with the ultrasonic probe the feedstock solvent was heated from ambient temperature to a temperature of about 200°F. The resulting feedstock solvent and dissolved rubber mixture was cooled, and examined under a magnification of 100 X power. The mixture appeared to be extremely homogenous, indicating that either dissolution of the rubber had taken place, or that minute rubber particles of uniform size were now evenly suspended in the mixture. For convenience this mixture of hydrocarbon and liquid is termed herein a solution, but only broadly since the rubber may not be in solution but rather in suspension as minute solid particle of disintegrated rubber.

A further test was conducted on a slice of "-polyglass" tire weighing about 344 grams. The slice of tire was immersed in 716 grams of the carbon black aromatic feedstock and then contacted with a probe consisting of an exponential horn having a surface area of 1 sq. centimeter ($cm^2$). The probe was driven by a Branson Sonifer, Model J17A at a frequency of about 20 kHz and a power intensity of 100 $W/cm^2$ of transducer surface area. The probe was pressed into portions of the immersed tire for a nominal period of time, after which the tire was removed from the liquid, washed with acetone, dried and weighed. The remaining portion of the tire weighed about 270 grams, indicating that approximately 70 grams of the tire had been removed by the process. In addition, a visual examination of the remaining hydrocarbon liquid mixture showed that glass fibers originally in the polyglass tire had also been removed but were otherwise intact and resting on the bottom of the container. Such glass fibers are easily separated from the liquid by any suitable method such as filtration, classification, or decantation.

Figure 2:
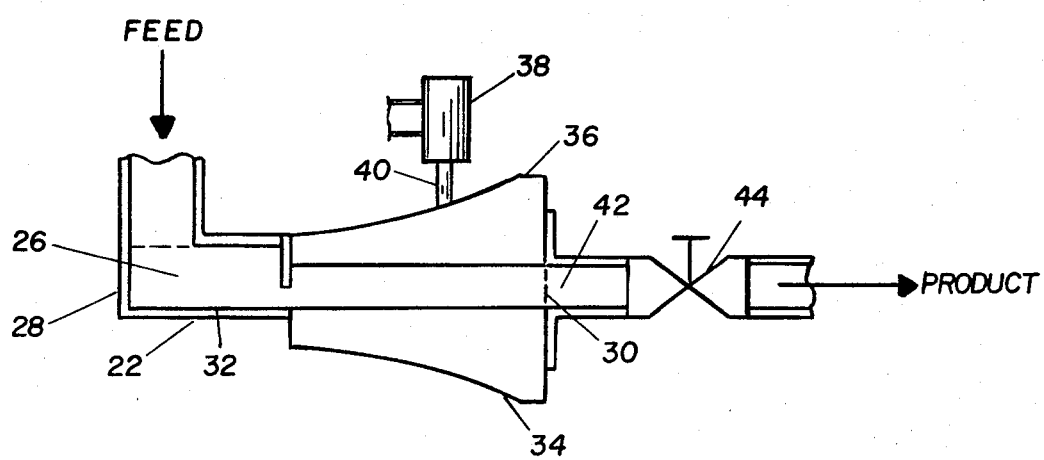
FIG. 2 illustrates a continuous process employing apparatus for dissolving rubber in a solvent.

A further variation of the process of this invention is shown in FIG. 2 of the drawing illustrating apparatus for continually applying the process. An elongated rectangularly shaped trough 22 is shown having an open top, sidewalls 26 and an endwall 28 with a fine mesh filter screen 30 acting as the other short side of the trough 22. The bottom 32 of the trough is formed from a suitable metal in which a bottom ultrasonic transducer 34 is mounted. While the bottom transducer may form the whole of the bottom wall, the bottom 32 is illustrated to have as large a transducer as practical. Above the bottom transducer 34, a second reciprocating ultrasonic transducer 36 is mounted by means not shown, so as to be positioned directly above the bottom transducer, and movable away and toward the bottom transducer 34. Suitable means are provided for reciprocally moving the upper reciprocating transducer, this being a dual acting hydraulic actuator 38 mounted above the transducer. The actuator axially moves a rod 40 which is connected to the reciprocating transducer. The throw of the rod 40 is such that the reciprocating transducer is moved from its upper position adjacent to the top of the trough to a position in abutting relationship with the bottom transducer 34. In practice the throw of the rod may be any desirable distance since only a portion of the rubber charged to the trough need be contacted during each reciprocating movement when using two oppositely mounted transducers.

A discharge conduit 42 is connected to the trough on the other side of the filter screen and has a valve 44 mounted therein for controlling discharge flow. Lastly, each of the transducers 34 and 36 is connected to a suitable power supply not shown.

In operation, a charge of rubber and a liquid hydrocarbon is fed into the trough from a source not shown while the reciprocating transducer is in its upper position. At the time ultrasonic power is not applied to either of the transducers. After sufficient charge is introduced into the trough, ultrasonic generating power is introduced to both of the transducers. The double acting actuator simultaneously drives the rod and its attached reciprocating transducer downward at a slow rate. Rubber being contacted by the transducers is promptly disintegrated and suspended and/or dissolved in the liquid. The dissolved rubber and liquid passes through the filter screen into the discharge conduit under the driving force of the downwardly moving transducer 36. At the end of the downward stroke the discharge valve 44 is opened and the liquid mixture withdrawn, and the ultrasonic power shut off. Valve 44 is then closed and the reciprocating transducer moved upwardly by the now retracting activator rod to allow another charge of rubber and solvent to be introduced.

Suitable versions of the above described apparatus are apparent from the aforesaid description. For instance, the upper reciprocating transducer may be unpowered or it may be alternatively powered in order to minimize heat buildup in either of the transducers. If unpowered it may be viewed functionally as an upper reciprocating wall moving downwardly towards the bottom transducer which solely applies ultrasonic energy to the rubber and solvent charge. In addition, the charge may be introduced through a pipe leading from apparatus which grinds up the tires and immerses the ground-up tires in a solvent, a portion of the solvent being previously filtered to recover those components of the tire which are easily dissolvable.

While the process has been described in reference to the treatment of rubber (either synthetic, natural, or mixtures thereof), it is contemplated that the process is equally applicable to other hydrocarbon solids such as the various classes of plastics including the polyolefins, polyesters, polyamides, (e.g. nylon) and other high molecular weight resins and polymers.

Having fully described my invention and wishing to cover those variations and modifications which would be apparent to one skilled in the art, without departing from either the scope or spirit thereof,

I claim:

1. Method of treating rubber comprising immersing the rubber in a liquid hydrocarbon, and contacting the immersed rubber with a source of ultrasonic energy within the range of from 10 kilohertz to about 40 kilohertz and at a power intensity of greater than 100 watts per square centimeter of material.

2. The method of claim 1 wherein said liquid hydrocarbon is a suitable solvent for rubber.

3. The method of claim 2 wherein said liquid hydrocarbon is an aromatic hydrocarbon.

4. The method of claim 2 wherein said liquid hydrocarbon is a hydrocarbon feedstock suitable for producing carbon black.

5. The method of claim 1 wherein said ultrasonic irradiation is in the range of about 20 kilohertz and at a power density of about 100 watts per square centimeter.

6. The method of claim 5 wherein a mixture of the rubber and the liquid hydrocarbon is passed through the source of ultrasonic energy.

* * * * *